(12) United States Patent
Lankes et al.

(10) Patent No.: US 10,847,873 B2
(45) Date of Patent: Nov. 24, 2020

(54) SYSTEM FOR THE WIRELESS COUPLING OF A CELLULAR RADIO END DEVICE TO AN EXTERNAL ANTENNA STRUCTURE

(71) Applicant: Continental Advanced Antenna GMBH, Hildesheim (DE)

(72) Inventors: Thomas Lankes, Rosenheim (DE); Gerhard Stadler, Raubling (DE); Rudolf Weber, Tuntenhausen (DE); Max Maier, Riedering (DE)

(73) Assignee: CONTINENTAL ADVANCED ANTENNA GMBH, Hildesheim (DE)

( * ) Notice: Subject to any disclaimer, the term of this patent is extended or adjusted under 35 U.S.C. 154(b) by 343 days.

(21) Appl. No.: 15/565,345

(22) PCT Filed: Apr. 8, 2016

(86) PCT No.: PCT/EP2016/000591
§ 371 (c)(1),
(2) Date: Oct. 9, 2017

(87) PCT Pub. No.: WO2016/162126
PCT Pub. Date: Oct. 13, 2016

(65) Prior Publication Data
US 2018/0076513 A1  Mar. 15, 2018

(30) Foreign Application Priority Data
Apr. 9, 2015  (DE) .......................... 10 2015 004 722

(51) Int. Cl.
*H01Q 1/38*  (2006.01)
*H01Q 1/32*  (2006.01)
(Continued)

(52) U.S. Cl.
CPC ....... *H01Q 1/3275* (2013.01); *B60R 11/0241* (2013.01); *H01Q 1/1257* (2013.01);
(Continued)

(58) Field of Classification Search
CPC ...... H01Q 1/3275; H01Q 1/1257; H01Q 1/38; H01Q 3/24; H01Q 9/285; H01Q 21/28
See application file for complete search history.

(56) References Cited

U.S. PATENT DOCUMENTS 5,177,493 A * 1/1993 Kawamura .......... H01Q 1/1278
343/713
6,031,492 A  2/2000 Griffin et al.
(Continued)

FOREIGN PATENT DOCUMENTS

CN  201674489 U  12/2010
CN  102064843 A  5/2011
(Continued)

OTHER PUBLICATIONS

China National Intellectual Property Administration, Office Action and Search Report Issued in Application No. 201680020786.0, dated May 27, 2019, 21 pages.
(Continued)

*Primary Examiner* — Graham P Smith
(74) *Attorney, Agent, or Firm* — McCoy Russell LLP

(57) ABSTRACT

The present invention relates to a system for the wireless coupling of a cellular radio end device to at least one first external antenna, in particular for coupling to an external vehicle antenna, having a coupling structure for the wireless coupling to an antenna structure of the cellular radio end device, wherein the coupling structure has at least two connections; and having a connection unit that connects the first external antenna to one of the at least two connections of the coupling structure in dependence on the coupling quality, wherein the connection unit evaluates the coupling quality between the antenna structure of the cellular radio end device and the at least two connections of the coupling structure during the normal communication operation of the
(Continued)

cellular radio end device and/or continuously and/or for both connections simultaneously.

18 Claims, 11 Drawing Sheets

(51) Int. Cl.
    *H04B 1/3877* (2015.01)
    *B60R 11/02* (2006.01)
    *H01Q 1/12* (2006.01)
    *H01Q 3/24* (2006.01)
    *H01Q 9/28* (2006.01)
    *H01Q 21/28* (2006.01)
    *H04B 5/00* (2006.01)
    *H04M 1/04* (2006.01)
    *H04M 1/60* (2006.01)
    *H04M 1/725* (2006.01)

(52) U.S. Cl.
    CPC ............... *H01Q 1/38* (2013.01); *H01Q 3/24* (2013.01); *H01Q 9/285* (2013.01); *H01Q 21/28* (2013.01); *H04B 1/3877* (2013.01); *H04B 5/0037* (2013.01); *H04M 1/04* (2013.01); *H04M 1/6041* (2013.01); *H04M 1/72527* (2013.01)

(56) References Cited

U.S. PATENT DOCUMENTS

| | | | |
|---|---|---|---|
| 8,238,984 B2 | 8/2012 | Pursche et al. | |
| 8,996,081 B2 * | 3/2015 | Lachnitt | H04M 1/04 |
| | | | 455/13.3 |

FOREIGN PATENT DOCUMENTS

| | | |
|---|---|---|
| DE | 102007044294 A1 | 12/2008 |
| DE | 102007039879 A1 | 3/2009 |
| DE | 102010026698 A1 | 1/2012 |
| DE | 102012007922 A1 | 10/2013 |
| EP | 2011243 B1 | 8/2009 |
| IE | 102010019904 A1 | 11/2011 |
| IE | 102012112266 B3 | 4/2014 |
| JP | H11122137 A | 4/1999 |
| WO | 2012004309 A2 | 1/2012 |

OTHER PUBLICATIONS

ISA European Patent Office, International Search Report Issued in Application No. PCT/EP2016/000591, dated Jun. 30, 2016, WIPO, 5 pages.

* cited by examiner

SYSTEM FOR THE WIRELESS COUPLING OF A CELLULAR RADIO END DEVICE TO AN EXTERNAL ANTENNA STRUCTURE

CROSS-REFERENCE TO RELATED APPLICATION

The present application is a U.S. National Phase of International Patent Application Serial No. PCT/EP2016/000591, entitled "SYSTEM FOR WIRELESSLY COUPLING A MOBILE TELPHONY TERMINAL TO AN EXTERNAL ANTENNA STRUCTURE," filed on Apr. 8, 2016. International Patent Application Serial No. PCT/EP2016/000591 claims priority to German Patent Application No. 10 2015 004 722.1, filed on Apr. 9, 2015. The entire contents of each of the abovementioned applications are hereby incorporated by reference in their entirety for all purposes.

TECHNICAL FIELD

The present invention relates to a system for the wireless coupling of a cellular radio end device to at least one external antenna structure having at least one first external antenna. The system in accordance with the invention in this respect in particular serves the coupling of a cellular radio end device to an external vehicle antenna structure.

BACKGROUND AND SUMMARY

To circumvent the damping of the cellular radio signals by the vehicle body, vehicles are frequently equipped with an external vehicle antenna structure. It can, for example, be arranged on the vehicle roof and therefore has substantially better transmission and reception properties than the antenna structure of the cellular radio end device operated within the vehicle.

To connect the cellular radio end device to the external vehicle antenna structure, some cellular radio end devices are equipped with an antenna output that can be connected to an antenna cable of the vehicle's own antenna system via a corresponding plug-in connection. However, more recent cellular radio end devices only seldom have such an antenna connection. Such a connection that has to be established manually is furthermore impractical for the user.

Systems are known in this respect for the wireless coupling of the cellular radio end device to the external antenna structure. They typically have a coupling structure for the wireless coupling to the antenna structure of the cellular radio end device. The coupling structure in this respect is typically arranged in the region of a receiver for the cellular radio end device and couples wirelessly to the antenna structure of the cellular radio end device so that the transmission signals of the cellular radio end device can be forwarded to the external antenna and the signals received by the external antenna can be forwarded to the antenna structure of the cellular radio end device.

In most of the known systems, the coupling structure has its own connection that is connected to the external antenna via an antenna line and, optionally, via a compensator that compensates the cable losses and coupling losses. Corresponding systems are known, for example, from DE 10 2012 112 266 B3, DE 10 2010 019 904 A1, DE 10 2007 039 879 A1 and EP 2 011 243 B1. Such a coupling structure, however, does not provide an ideal coupling for every cellular radio end device. On the one hand, this is due to the fact that the antennas are typically arranged at different positions in different cellular radio devices. The coupling structure can therefore not be optimized toward one specific antenna structure. If the receiver for the cellular radio end device is also not specifically adapted to the individual cellular radio end device types, the exact positioning of the cellular radio end device in the receiver is moreover unknown.

A coupling structure is therefore known from DE 10 2007 044 294 B4 having a plurality of antennas and accordingly a plurality of connections. In this respect, the system has a connection unit that connects one of these antennas to the external antenna. Before the start of communication in the cellular radio network, the connection unit wirelessly initiates contact with the cellular radio end device and instructs it to transmit sinusoidal signals. The connection unit measures the degree of coupling of the individual antennas of the coupling structure successively during the transmission of these signals and stores it in a buffer memory to connect the antenna having the best degree of coupling to the external antenna at the end. Once the connection has been established, communication in the mobile radio network is initiated.

The inventors of the present invention, however, have recognized that such a procedure does not always guarantee an ideal coupling of the cellular radio end device to the external antenna. It is therefore the object of the present invention to provide an improved system for the wireless coupling of a cellular radio end device to at least one external antenna structure.

This object is achieved by a system for the wireless coupling of a cellular radio end device to an external antenna structure having at least one first external antenna, in particular for coupling to an external vehicle antenna structure, having a coupling structure for the wireless coupling to an antenna structure of the cellular radio end device, with the coupling structure having at least two connections, and having a connection unit that connects the first external antenna to one of the at least two connections of the coupling structure in dependence on a the coupling quality, wherein the connection unit evaluates the coupling quality between the antenna structure of the cellular radio end device and the at least two connections of the coupling structure during the normal communication operation of the cellular radio end device and/or continuously and/or for both connections simultaneously; and by a system for the wireless coupling of a cellular radio end device to an external antenna structure having at least one first external antenna, in particular to an external vehicle antenna structure, having a coupling structure for the wireless coupling to an antenna structure of the cellular radio end device, with the coupling structure having at least two connections, and having a connection unit that connects the coupling structure to the external antenna structure, wherein the at least two connections of the coupling structure are connectable by the connection unit to the first external antenna and to at least one second external antenna of the external antenna structure.

In accordance with a first aspect, the present invention comprises a system for the wireless coupling of a cellular radio end device to an external antenna structure having at least one external antenna, in particular for coupling to an external vehicle antenna structure. In this respect, the system comprises a coupling structure for the wireless coupling to an antenna structure of the cellular radio end device, with the coupling structure having at least two connections. The coupling structure in this respect in particular serves the wireless coupling to a cellular radio antenna structure of the cellular radio end device and/or the external antenna structure is a cellular radio antenna structure. The system furthermore comprises a connection unit that connects the first external antenna in dependence on the coupling quality to one of the at least two connections of the coupling structure. Provision is made in this respect in accordance with the invention that the connection unit evaluates the coupling quality between the antenna structure of the cellular radio end device and the at least two connections of the coupling structure during the normal communication operation of the cellular radio end device and/or continuously and/or simultaneously for both connections.

In this respect, the present invention takes into account that the antenna structure of a modern cellular radio end device, and in particular of a smartphone, typically comprises a plurality of antennas. They are, for example, arranged at different positions in the proximity of the case of the cellular radio end device. Respectively different, spatially separate antennas can in this respect be present for the supported cellular radio services such as GSM, UMTS and/or LTE. Different antennas can therefore be used depending on which cellular radio service the cellular radio end device works in. A frequency dependency of the coupling can furthermore result.

The evaluation of the coupling quality in accordance with the invention during the normal communication operation of the cellular radio end device, i.e. while the cellular radio end device communicates in the cellular radio network, therefore allows a very much more realistic estimation of the coupling quality than the test mode before the initiation of communication known from the prior art. In addition, the evaluation of the coupling quality during the normal communication operation of the cellular radio end device has the large advantage that the cellular radio end device does not have to be separately directed to transmit test signals. The connection unit in accordance with the invention can therefore manage without any kind of communication with the cellular radio end device and can therefore be designed in a substantially simpler manner.

The continuous evaluation of the coupling quality in accordance with the invention has the advantage that changes in the coupling quality that result, for example, from the operation in a different cellular radio service or at a different frequency or also simply by a displacement of the cellular radio end device relative to the coupling structure can be recognized and taken into account.

A continuous evaluation of the coupling quality in accordance with the present invention can be implemented in this respect, for example, in that the coupling quality is evaluated at a plurality of consecutive points in time or in a plurality of consecutive time periods. The continuous evaluation therefore does not have to take place constantly, but can also take place selectively or with interruptions.

Provision can therefore be made in a possible embodiment that an evaluation of the coupling quality only takes place when the applied signals satisfy predefined conditions and in particular when at least one applied signal level exceeds a minimum signal level threshold.

In an alternative embodiment, the continuous evaluation, however, takes place in the form of an evaluation that is at least continuous over certain time periods and further preferably continuously over the total operation.

It is ensured by the simultaneous evaluation of both connections in accordance with the invention that the coupling quality for both connections takes place under the same external conditions so that, for example, fluctuations in the signal strength that are based on the cellular radio protocol or on external influences are not incorrectly interpreted as changing coupling conditions.

Each of the three just discussed elements of the first aspect in accordance with the invention, i.e. that the coupling quality is evaluated first during the normal communication operation of the cellular radio end device and/or second continuously and/or third simultaneously for both connections, can in this respect be used in accordance with the invention respectively on their own and without two other elements. However, a combined use of at least two of these elements particularly preferably takes place and further preferably a common implementation of all three elements.

In a second aspect, the present invention comprises a system for the wireless coupling of a cellular radio end device to an external antenna structure having at least one external antenna, in particular to an external vehicle antenna structure. In this respect, the system has a coupling structure for the wireless coupling to an antenna structure of the cellular radio end device, with the coupling structure having at least two connections. The coupling structure in this respect in particular serves the wireless coupling to a cellular radio antenna structure of the cellular radio end device and/or the external antenna structure is a cellular radio antenna structure. The system further comprises a connection unit that connects the coupling structure to the external antenna structure. Provision is made in accordance with the invention in this respect that the at least two connections of the coupling structure are connectable to the first antenna and to at least one second external antenna of the external antenna structure by the connection unit.

The second aspect of the present invention in this respect considers that external antenna structures such as vehicle antenna structures can likewise have two separate antennas and that the antenna structure of modern cellular radio end devices typically also have a plurality of antennas. The second aspect of the present invention now allows the two connections of the coupling structure to be connected to such a first and second external antenna of an external antenna structure. The antennas can hereby be used simultaneously for the communication in the cellular radio network, for example to provide MIMO functionalities.

The at least two connections of the coupling structure in this respect are preferably connectable separately from one another to the first and second external antennas of the external antenna structure via the connection unit. The first and second external antennas can in particular be a primary antenna and a secondary antenna of the external antenna structure and in particular the external vehicle antenna structure. The separate connection of a respective one connection of the coupling structure to a respective external antenna thus enables a MIMO functionality. In this respect the first external antenna can be coupled to a first antenna of the cellular radio end device via one of the connections and the second external antenna can be connected to a second antenna of the cellular radio end device via the second connection of the coupling structure.

The first and second aspects of the present invention can in this respect be used independently of one another and are claimed independently of one another.

In this respect, the first aspect can in particular be used completely independently of the use of the second aspect, in particular when only one first external antenna is anyway present. The connection element can furthermore be designed, even with the presence of two external elements, such that a respective only one of these antennas is connected to one of the connections of the coupling structure.

In the same way, the second aspect can also be used without any evaluation of the coupling quality or using an evaluation of the coupling quality that, however, does not necessarily take place in accordance with the first aspect.

The connection unit in accordance with the second aspect can in particular simply provide a fixed connection between a first connection of the coupling structure and of the first external antenna and a fixed connection between a second connection of the coupling structure and the second external antenna in a particularly simple embodiment that is, however, in accordance with the invention, and can therefore, for example, be configured as two separate connection lines.

However, the connection unit in accordance with the second aspect preferably evaluates the coupling quality of the connections and connects the first and second external antennas to the first and second connections of the coupling structure in dependence on the coupling quality. As already presented, the evaluation of the coupling quality does not necessarily have to take place in accordance with the first aspect. The evaluation of the coupling quality, however, particularly preferably takes place in accordance with the first aspect, i.e. during the normal communication operation of the cellular radio end device and/or continuously and/or for both connections simultaneously.

Advantageous embodiments of the present invention that can be used both in a system in accordance with the first aspect in accordance with the invention and in accordance with the second aspect in accordance with the invention will be described in more detail in the following:

The present invention can be used with any desired external antenna structures. If the external antenna structure has a first and a second external antenna, they can be arranged both within an assembly, for example in a roof antenna, or spatially separate in two assemblies, one of the antennas, for example, in a roof antenna and the other in an outside mirror. The external antenna structure can therefore also be a distributed antenna structure.

The present invention can furthermore be used with any desired cellular radio end devices. The cellular radio end devices can in this respect in particular be portable cellular radio end devices and in particular cellular phones such as smartphones.

The most varied embodiments are possible with the coupling structure in accordance with the invention having at least two connections. It can in this respect in particular be a contiguous coupling structure that, however, has two spatially separate connections. The introduction or decoupling of the signals at different positions of the coupling structure can in this respect already provide considerably different coupling qualities in the coupling to the antenna structure of the cellular radio end device. In other possible embodiments, the coupling structure in contrast has separate and/or spatially separated coupling elements that each have at least one connection.

A number of possible embodiments are likewise conceivable in the specific embodiment of the coupling structure. Line structures can thus be used, for example, that can be both non-resonant and resonant. They can, for example, be microstrip lines. They can be arranged in the inner region of the coupling surface and/or at the margin of the coupling surface. Extended coupling structures in the plane such as a flat dipole or a slot antenna are also conceivable. Three-dimensional structures such as PIFAs or patch antennas are also possible. The elements of the coupling structure that are connected to the connections can in this respect be spatially separate or contiguous.

The connection unit in accordance with the invention is preferably designed such that it evaluates the coupling quality of the at least two connections of the coupling structure and connects the connection of the coupling structure having the better coupling quality to the first external antenna. If a primary external antenna and a secondary external antenna are provided in this process, the connection unit connects the connection of the coupling structure having the better coupling quality to the primary external antenna. If the coupling structure has more than two connections in this context, the connection having the best coupling quality is preferably connected to the first external antenna.

Provision can furthermore be made that the connection unit connects at least one connection having a worse coupling quality to an impedance and/or to the second external antenna. The connection of a connection of the coupling structure to an impedance allows the coupling quality of the corresponding connection to be continued to be evaluated. The impedance in this respect preferably has the same value as the impedance of the first external antenna and in particular amounts to between 20 ohms and 70 ohms, preferably between 30 and 60 ohms. The connection to a second external antenna allows an improved cellular radio connection for the cellular radio end device and MIMO functionalities. It furthermore likewise allows the further evaluation of the coupling quality. The impedance is preferably a component of the connection unit.

If in this context only one first external antenna is present, all the connections of the antenna structure except for the connection having the best coupling quality are preferably connected to an impedance.

If a second external antenna is present and if the coupling structure has more than two connections, the second external antenna is preferably connected to the connection of the coupling structure having the second best coupling quality or to a connection that satisfies a MIMO criterion and in particular provides the best MIMO functionality with respect to the first connection of the coupling structure that has been connected to the first external antenna. For from a technical viewpoint, the connection having the second-best coupling quality does not have to deliver the best performance for an MIMO operation. A predefined association of the connection of the coupling structure to the second external antenna in dependence on the connection having the best coupling quality that is connected to the first signal path is therefore conceivable. It could e.g. always be the connection having the greatest spatial distance (with respect to the respective associated coupling region) for the connection having the best coupling quality. This fixed association could be implemented in the form of logic circuits or of a look-up table.

The connection unit of the system in accordance with the invention in the preferred embodiment has an evaluation unit that evaluates the coupling quality of the first and second connections of the coupling structure to the antenna structure of the cellular radio end device and controls a switching unit that connects the first external antenna to one of the at least two connections of the coupling structure in dependence on the coupling quality. As shown above, the switching unit preferably connects the connection of the coupling structure having the better coupling quality to the first external antenna. If a second external antenna is provided, the switching unit preferably connects a connection having a worse coupling quality to the second external antenna. If no second external antenna is provided, the switching unit preferably connects a connection having a worse coupling quality to an impedance.

The connection unit can comprise a decoupling element for each of the signal paths of the at least two connections of the coupling structure, by which decoupling element a signal is decoupled from the respective signal path and is supplied to the evaluation unit. The decoupling element can, for example, be a directional coupler or a resistance coupler. The coupling damping can in this respect preferably be in a range between 10 dB and 20 dB, for example at 15 dB. The signal paths of the at least two connections of the coupling structure in this respect preferably extend from a connection of the connection unit to the switching unit, with the decoupling elements preferably being arranged in the signal path between the connection of the connection unit and the switching unit.

The evaluation unit preferably has at least two inputs that are connected to the signal paths via the decoupling elements. The evaluation unit is then preferably constantly connected to the signal paths. Even if the coupling structure has more than two connections, the connection unit can have a separate signal path for each connection and/or the evaluation unit can have a separate input for each of the connections, the separate input preferably being connected to the respective signal path via a decoupling element.

In accordance with the invention the evaluation unit can comprise a comparator and/or a comparison logic. In this respect, the comparator can in particular compare the coupling quality of the individual connections and can output a corresponding switch signal to the switching unit in dependence on which of the connections has the better coupling quality.

A comparison logic can be implemented by a microprocessor. The comparison logic preferably comprises at least one analog-to-digital converter that senses the signal level in the signal paths. The comparison logic preferably has at least two inputs for this purpose that are connected to the outputs of the level detectors.

In a possible embodiment, the comparison logic can comprise a separate analog-to-digital converter for each input or signal path. In an alternative embodiment, the comparison logic comprises an analog-to-digital converter that is associated with a plurality of inputs or signal paths and alternately senses the signals applied there. The alternating sensing, however, preferably takes place in such a fast alternation that the evaluation of the coupling quality of the respective signal paths nevertheless takes place simultaneously in the sense of the present invention, i.e. with a time lag that can be neglected in comparison with the time behavior of external disturbances.

The evaluation of the coupling quality preferably takes place on the basis of a mean value formation over a plurality of samples. If an analog-to-digital converter is used that is associated with a plurality of inputs or signal paths, the sensing preferably takes place such that a respective plurality of samples enter into the mean value formation with respect to a first input or signal path that were received intermittently with respect to samples that enter into the mean value formation with respect to a second input or signal path.

If a comparison logic is used, more complex switching procedures can also be implemented such as a two-point switching that prevents too frequent a switchover. A switchover can in particular only take place when the difference in coupling quality exceeds a minimum value.

The evaluation of the coupling quality in accordance with the invention preferably takes place on the basis of the signal level of the respective signals. Such an evaluation on the basis of the signal level allows a particularly simple design of the evaluation unit since no detailed assessment of communication signals has to take place. The evaluation unit in this respect preferably has a level detector for each signal path. In this respect, the signals of the level detectors are preferably supplied to the comparator and/or to the comparison logic and are compared with one another there.

In a possible embodiment, the evaluation unit has an interrupt control by which an evaluation of the coupling quality only takes place on an exceeding of a minimum level threshold. Such an interrupt control is preferably used when the evaluation of the coupling quality takes place digitally by a microprocessor. The computing load of the microprocessor can be reduced by the interrupt control.

The signal level for at least one of the signals can in particular be compared with the minimum level threshold, with the interrupt control only triggering an evaluation procedure when the minimum level threshold is exceeded. The signal levels for each signal path are preferably compared with the minimum level threshold, with the interrupt control triggering an evaluation procedure when the minimum level threshold in at least one signal path is exceeded. A comparator that controls the interrupt control can in particular be provided for each signal path.

The minimum level threshold can be set in a preferred embodiment.

The connection unit and in particular the evaluation unit can furthermore be configured such that the evaluation of the coupling quality takes place with reference to a transmission signal of the cellular radio end device.

The present invention in this respect takes into consideration that modern cellular radio end devices, for example, have a primary antenna and a secondary antenna for the LTE standard, with the primary antenna being used both for the transmission and the reception, while the secondary antenna only serves the reception. The coupling of the primary antenna of the cellular radio end device to the first external antenna is therefore of substantially greater significance for the operation of the cellular radio end device than the coupling of the secondary antenna of the cellular radio end device. Since the evaluation of the coupling quality in accordance with the invention takes place with reference to the transmission signal of the cellular radio end device, it is ensured that the connection of the coupling structure that has the best coupling to the primary antenna of the cellular radio end device is connected to the first external antenna.

This has advantages, on the one hand, in the operation with only a first external antenna (SISO) since it is ensured in this case that the primary antenna of the cellular radio end device is connected to the only external antenna having a high coupling quality. This procedure, however, also has advantages in the operation with only a first and second external antenna (MIMO) since it is ensured in this case that the primary antenna of the cellular radio end device is connected to the primary external antenna having a high coupling quality, with a connection simultaneously also being established between the secondary antenna of the cellular radio end device and the secondary external antenna.

The connection unit can furthermore be configured such that the evaluation of the coupling quality takes place with reference to the cellular radio transmission signal of the cellular radio end device. In this respect different transmission signals of the cellular radio end device for other communication services such as for a wireless LAN service and/or Bluetooth service can remain out of consideration in the evaluation of the coupling quality.

In a preferred embodiment of the present invention, specific frequency ranges remain out of consideration for the evaluation of the coupling quality.

In this respect, in particular a wireless LAN frequency range and/or a Bluetooth frequency range preferably remain out of consideration. The inventors of the present invention have recognized in this respect that the relatively strong wireless LAN transmission signals and/or Bluetooth transmission signals of the cellular radio end device can interfere with the evaluation of the coupling quality of the cellular radio antenna structure of the cellular radio end device to the coupling structure and should therefore remain out of consideration in the evaluation.

In a further embodiment of the present invention, a reception frequency range of the cellular radio signal could remain out of consideration. It would be ensured by this that actually only the transmission signals of the cellular radio end device are considered in the evaluation. Since the reception signals are, however, typically anyway considerably weaker than the transmission signals of the cellular radio end device, such a filtering of the reception frequency ranges is not necessary for every use.

The corresponding frequency ranges are preferably filtered from the signal in this respect. At least one corresponding filter is preferably provided for filtering at least one specific frequency range. It can in particular be a wireless LAN filter and/or a Bluetooth filter. A filter is in this respect preferably associated with each input of the evaluation unit and/or with each signal path. A corresponding filter can in this respect in particular be provided in the signal path before the coupling element or between the decoupling element and the level detector. It is preferably a notch filter in this respect.

In a preferred embodiment of the present invention, the switchover decision takes place by the connection unit with reference to a coupling quality determined over a specific tie interval. The dynamic behavior of the connection unit can be predefined by the magnitude of this time interval. If a level detector is used in accordance with the invention, the time interval can simply be predefined via the speed of the level detectors.

Since the switchover decision takes place with reference to a determination of the coupling quality over a time interval, it is ensured that procedures that run faster in time do not trigger any switchover decision. The time interval is preferably selected in this respect such that changes in the signal level that are not based on the coupling quality, but rather on the details of the communication protocol, remain out of consideration.

A mean value formation and/or a maximum value formation preferably take(s) place over the time interval in this respect. Such a mean value formation and/or maximum value formation can, for example, be implemented by the analog design of the level detector used. An integration over a certain time constant can in particular take place. A mean value formation and/or a maximum value formation would, however, also be digitally implementable.

The switchover decision in this respect preferably takes place on the basis of an evaluation of the coupling quality that took place over a time interval between 1 ms and 500 ms. The time interval preferably amounts to between 15 ms and 100 ms. It can in particular hereby be prevented that changes in the signal level due to the communication protocol result in switchover decisions that are not wanted. Conversely, the connection unit still reacts very fast to actual changes in the coupling quality.

The time interval is preferably selected in this respect that it comprises both transmission signals and reception signals of the cellular radio signal in the case of a time multiplex division. It can hereby be ensured that the typically much stronger transmission signals determine the switchover behavior of the connection unit and the reception signals do not have any influence thereon. It is hereby ensured that the evaluation of the coupling quality takes place with reference to the transmission signal of the cellular radio end device.

The connection unit in this respect preferably evaluates the coupling quality over a plurality of bursts and/or subframes and/or frames of the cellular radio signal. The control can, for example, integrate the signal for this over a plurality of bursts and/or subframes and/or frames.

The system in accordance with the invention can furthermore comprise a compensator that is arranged between the connection unit and the first and/or second external antennas in the signal path. The compensator is used to compensate coupling losses and losses in the signal lines between the coupling structure and the external antenna.

If a first and second external antenna are provided, the compensator preferably has a first and second signal path. The signal processing and/or the compensation preferably take(s) place in the first and second signal paths in this respect. A transmission amplification preferably only takes place in this respect for the uplink path from the cellular radio end device to the external antenna in one signal path, and in particular in the signal path that is connected by the connection unit to the primary antenna of the cellular radio end device.

The system in accordance with the invention can furthermore comprise a support and/or a receiver for the cellular radio end device, with the coupling structure being arranged in the region of the support and/or receiver. The support and/or receiver can comprise further coupling structures and/or functional elements, for example functional elements for wireless power charging (WPC) or near field communication (NFC). These functional elements can in this respect have an influence on the coupling quality of the individual connections of the coupling structure in accordance with the invention. Such influences can, however, be taken into consideration and compensated by the present invention since it is always the connection having the currently best coupling quality that is connected to the first external antenna.

The support and/or receiver is in this respect preferably configured such that the cellular radio end device can at least be freely positioned within a specific region. A particularly simple operation hereby results for the user since the cellular radio end device simply only has to be placed in any desired position onto the support or into the receiver. In this respect, in particular no adaptation of the support and/or receiver to different cellular radio end device types has to take place. Depending on the position and type of the cellular radio end device, a different arrangement of the antenna structure of the cellular radio end device to the coupling structure hereby admittedly results. However, it is also ensured by the evaluation of the coupling quality in accordance with the invention here that a good coupling of the antenna structure of the cellular radio end device takes place to the coupling structure and thus to the external antenna.

The support and/or receiver preferably has a slip-resistant surface to prevent a slipping of the cellular radio end device. Relative movements of the cellular radio end device with respect to the coupling structure can, however, also be compensated by the present invention.

The connection unit in accordance with the present invention can form an assembly with the coupling structure. This assembly can in this respect in particular be connectable to the support and/or receiver and can in particular be installable at or in a corresponding housing.

In addition to the systems in accordance with the invention, the present invention further comprises corresponding connection units for such systems. The connection units are in this respect in particular designed such as was already presented in more detail above with respect to the system in accordance with the invention.

In accordance with the first aspect of the present invention the connection unit is configured in this respect such that it connects a first external antenna to one of at least two connections of a coupling structure in dependence on a coupling quality. The connection unit in this respect evaluates the coupling quality between the antenna structure of the cellular radio end device and the at least two connections of the coupling structure during the normal communication operation of the cellular radio end device and/or continuously and/or simultaneously for both connections.

A communication unit in accordance with the second aspect of the present invention is configured such that it connects a coupling structure having at least two connections to an external antenna structure. Provision is made in accordance with the invention in this respect that the at least two connections of the coupling structure are connectable to at least one first external antenna and to at least one second external antenna of the external antenna structure by the connection unit. The two connections of the coupling structure in this respect are preferably connectable separately from one another to the first and second external antennas of the external antenna structure via the connection unit.

The connection units are in this respect preferably configured such as was already presented in more detail above with respect to the systems in accordance with the invention. In this respect, they in particular have an evaluation unit and a switching unit. The connection units can furthermore comprise decoupling elements that are associated with the respective signal paths. Level detectors and/or filters can furthermore be provided and/or a comparator and/or a comparison logic. If the connection unit is configured such that it connects at least one connection to an impedance, the impedance preferably forms a part of the connection unit in accordance with the invention.

The connection unit in accordance with the invention preferably has at least one first connection and one section connection for connection to the at least two connections of the coupling structure. The connection unit furthermore preferably has at least one third connection for connection to a first external antenna. In a first embodiment, the connection unit in this respect only has one such third connection for connection to a first external antenna. In a second embodiment, the connection unit in contrast has at least one third connection and one fourth connection for connection to at least one first external antenna and one second external antenna. The first and second connections of the connection unit can in particular be provided, for example, by a soldered connection when the connection unit forms an assembly with the coupling structure. The third and/or fourth connections to the first and/or second antennas is in contrast preferably configured as a plug-in connection, in particular as a corresponding socket.

In a possible embodiment of the present invention, the connection unit can form a separate assembly. It can in particular be arranged at any desired point between the coupling structure and the external antenna. The connection unit, however, preferably forms an assembly with the coupling structure and/or is integrated into the support and/or receiver for the cellular radio end device together with the coupling structure. The signal paths between the coupling structure and the connection unit are hereby kept short. The possibly present compensator either forms an assembly separate from the connection unit or is likewise integrated in the assembly.

The present invention furthermore also comprises independently of the above-described systems and connection units a method for coupling an antenna structure of a cellular radio end device to at least one external antenna. In this respect, the coupling of the antenna structure of the cellular radio end device takes place wirelessly by means of a coupling structure that has at least two connections, with the first external structure being connected to one of the at least two connections of the coupling structure in dependence on the coupling quality.

Provision is made in this respect in accordance with the invention in accordance with a first aspect that the coupling quality between the antenna structure of the cellular radio end device and the at least two connections of the coupling structure is evaluated during the normal communication operation of the cellular radio end device and/or continuously and/or simultaneously for both connections.

Provision is made in accordance with a second aspect that the at least two connections of the coupling structure are connected to at least one first external antenna and a second external antenna of the external antenna structure.

The methods in accordance with the invention in this respect have the same advantages that have already been presented in more detail above with respect to the system in accordance with the invention.

The methods in this respect preferably take place such as has already been described in more detail above. The methods in accordance with the invention furthermore preferably take place while using the above-described systems and/or connection units.

The present invention will now be described in more detail with reference to an embodiment and to drawings.

DETAILED DESCRIPTION

Figure 1:
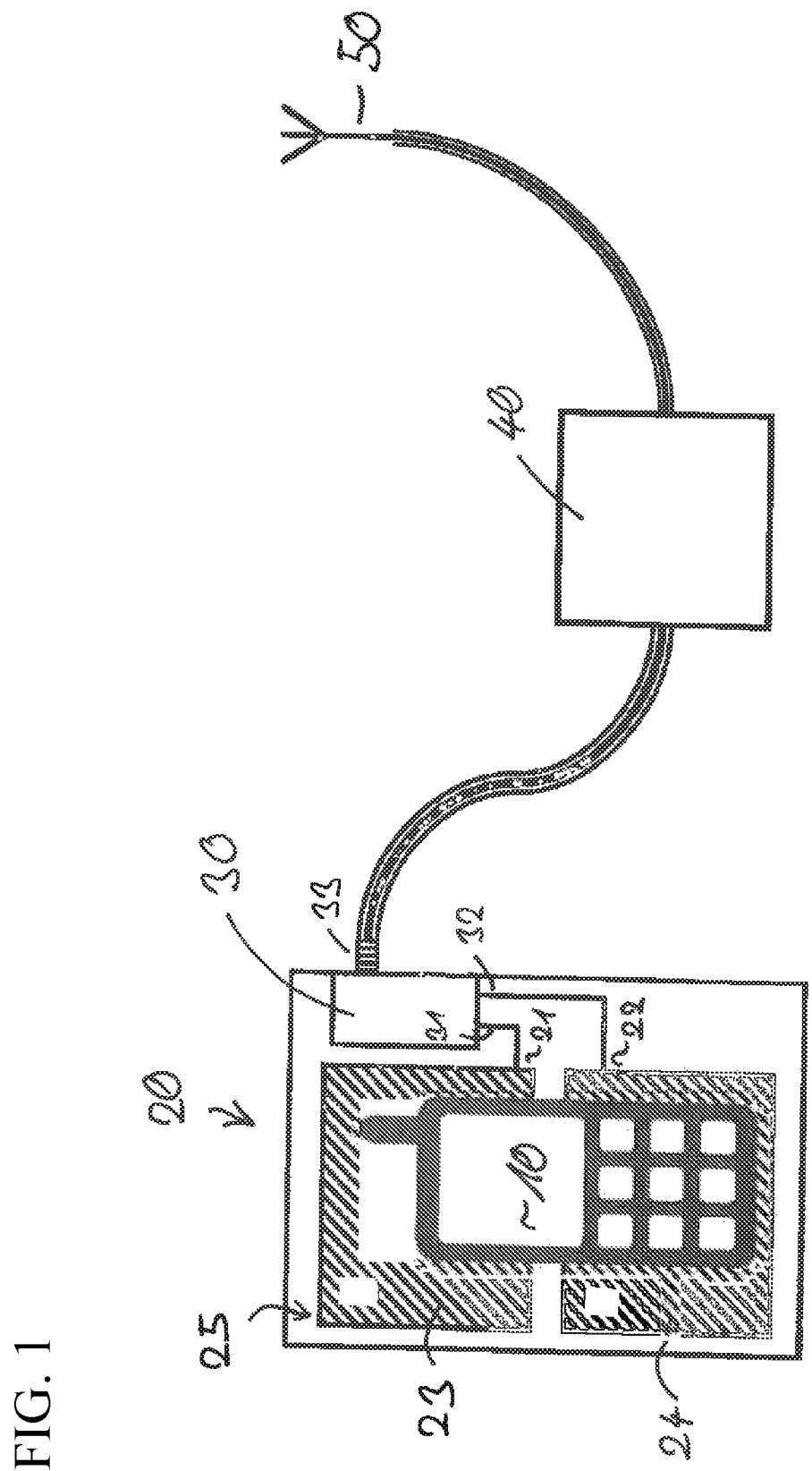
FIG. 1 shows a schematic diagram of a first embodiment of a system in accordance with the invention.

A first embodiment of a system in accordance with the invention for the wireless coupling of a cellular radio end device 10 to a first external cellular radio antenna 50 is shown in FIG. 1. The system comprises a coupling structure 25 for the wireless coupling to a cellular radio antenna structure of the cellular radio end device 10 not shown in any more detail in FIG. 1. The connection between the coupling structure 25 and the external cellular radio antenna 50 takes place via a connection unit 30.

The coupling structure in this respect has a first connection 21 and a second connection 22 that are connected to a first connection 31 and to a second connection 32 of the connection unit 30. The connection unit in this respect has a third connection 33 that is connected to the external antenna 50. In the embodiment, the coupling structure 25 and the connection unit form an assembly. The connection 33 for the external antenna 50 is formed as a socket for connection of an antenna cable.

In the embodiment, a compensator 40 is furthermore provided between the output 33 of the connection unit 30 and the external antenna 50. The compensator is, however, only optional.

The external antenna 50 is here an external automotive antenna. Such external automotive antennas are arranged, for example, in the region of the roof of a motor vehicle and provide an improved cellular radio reception. The system in accordance with the invention having the coupling structure 25 and the connection unit 30 in this respect provides a wireless coupling of the external antenna 50 to the internal antenna structure of the cellular radio end device 10.

The coupling structure in the embodiment shown in FIG. 1 has two spatially separate coupling elements 23 and 24 that are connected via the first and second connections 21 and 22 to the connection unit 30. Alternatively, however, it could also be a contiguous coupling structure having two separate connections arranged in different spatial positions. The most varied configurations are possible for the coupling structure. Line structures such as microstrip lines can be used, for example. The line structures can in this respect be non-resonant or resonant. The line structures can be arranged in the inner region of the coupling surface and/or at the margin of the coupling surface. Alternatively or additionally, expanded antenna structures can be used in the plane such as a flat dipole or a slot antenna. Three-dimensional structures such as PIFAs and patch antennas can equally be used.

The antenna structure 25 is in this respect arranged in the region of a coupling surface 20. The antenna structure can in this respect in particular be provided in the region of a receiver or support for the cellular radio end device 10. It can in this respect, for example, simply be a horizontal surface or a receiver in the region of the dashboard or of the transmission hump in the passenger compartment of the motor vehicle. The cellular radio end device can in this respect preferably be placed on the support or into the tray in any desired positions in the region of the coupling surface 20. Furthermore, a specific design of the tray or receiver for specific cellular radio types is also preferably not provided. This embodiment means, however, that the positioning of the cellular radio end device 10 on the coupling surface 20 can differ on the coupling surface 20 and thus relative to the coupling structure 25 depending on the cellular radio end device type and on the specific placement position and can, for example, also change during the trip due to a slipping or displacing of the cellular radio end device.

Figure 2:
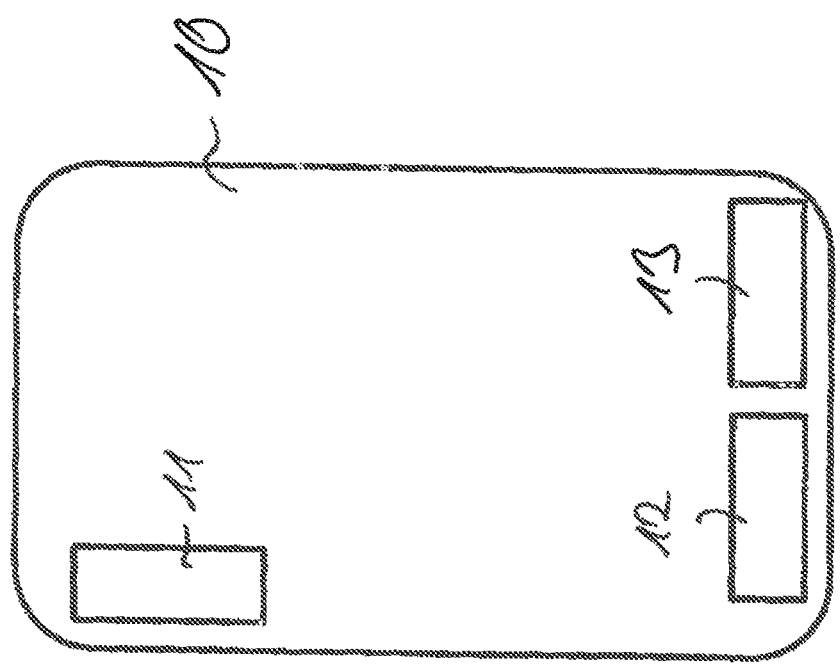
FIG. 2 shows a schematic diagram of a cellular radio end device that is couplable via a system in accordance with the invention.

A typical arrangement of cellular radio antennas 11 to 13 within a cellular radio end device 10 is shown in this respect in FIG. 2. The cellular radio antennas 11 to 13 are in this respect typically arranged on the rear side of the cellular radio end device in a marginal region or in the vicinity of the case. Modern cellular radio end devices, in particular smartphones, in this respect typically have a plurality of antenna structures. In this respect, different antennas can be provided for respective different supported cellular radio services such as GSM, UMTS, and LTE. A plurality of antennas can furthermore also be provided for a single cellular radio service. In the example shown in FIG. 2, a primary antenna 12 that is used both for GSM and for UMTS is provided in this respect. A separate primary antenna 13 is furthermore provided for LTE. A secondary antenna 11 is furthermore provided for LTE so that the MIMO functionality of LTE is supported. The primary antenna 13 for LTE is in this respect typically used both for the transmission (uplink) and for the reception (downlink). The secondary antenna 11 is in contrast only used for the reception (downlink). The positioning of the antennas of the cellular radio end device relative to the coupling structure therefore influences the coupling of the individual antennas to the coupling structure.

Figure 3:
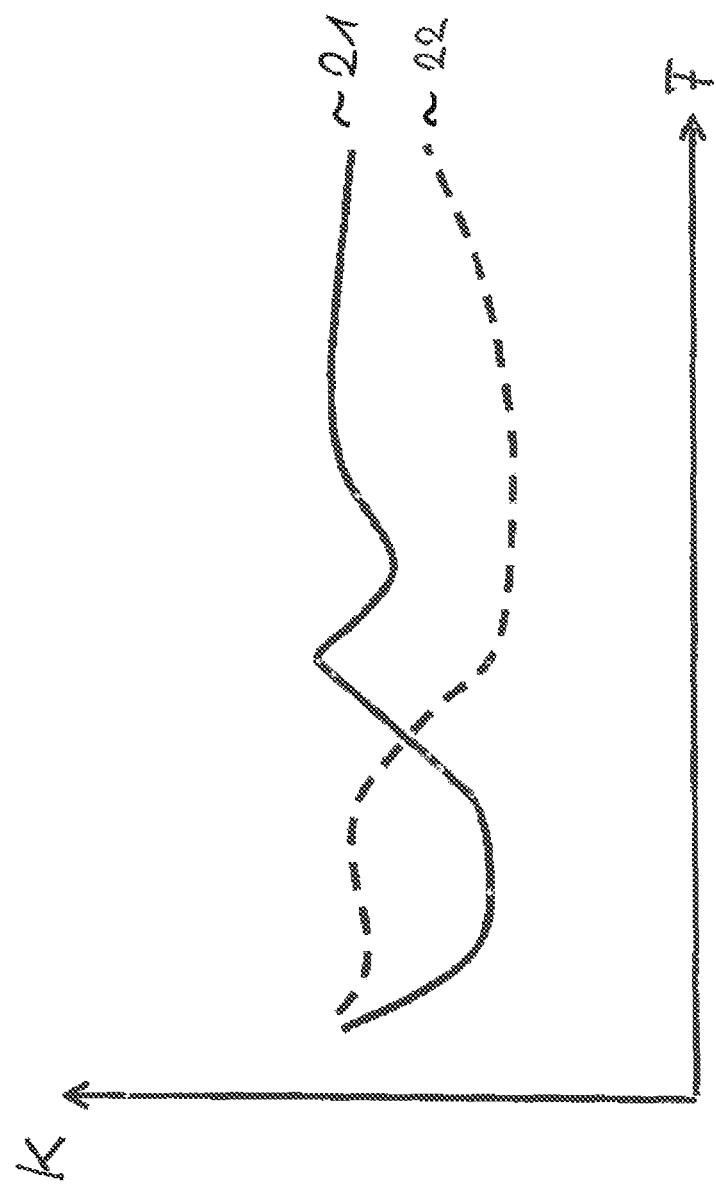
FIG. 3 shows a diagram of the coupling quality of the two connections of the coupling structure in dependence on the frequency.

A frequency dependency is found in addition to the positioning dependency of the coupling damping between the two connections of the coupling structure 25 and the cellular radio end device. In this respect, an exemplary progression of the coupling damping K in dependence on the frequency F is shown in FIG. 3 for the first connection 21 and the second connection 22. The frequency dependency can in particular be due to the fact that different antennas are used for different cellular radio services and thus for different cellular radio frequencies, said antennas accordingly having a different spatial positioning with respect to the coupling elements. As can be seen in FIG. 3, the coupling damping is lower in this respect in a first, left region for the first connection 21, while it is lower for a second, right region for the second connection 22.

Depending on the relative position of the cellular radio end device with respect to the coupling structure and depending on which of the antennas of the cellular radio end device are just being used in which frequency range, now the first connection of the coupling structure and now the second connection of the coupling structure can therefore have a better coupling to the active antenna of the cellular radio end device.

The connection unit in accordance with the invention therefore evaluates the coupling quality of the connections 21 and 22 of the coupling structure 25 with the antenna structure for the cellular radio end device 10 and connects one of these two connections to the external antenna 50 in dependence on the coupling quality.

In accordance with the first aspect of the present invention, a continuous evaluation of the coupling damping or of the coupling quality over all connections takes place in this respect by a comparison of the respective power of the transmission signal (uplink) of the cellular radio end device. The evaluation thus takes place during the normal cellular radio communication operation of the cellular radio end device, and indeed continuously and for all connections simultaneously. The present invention thus allows a dynamic adaptation of the connection to the external antenna to changing coupling conditions between the cellular radio end device 10 and the coupling structure 25.

Figure 4:
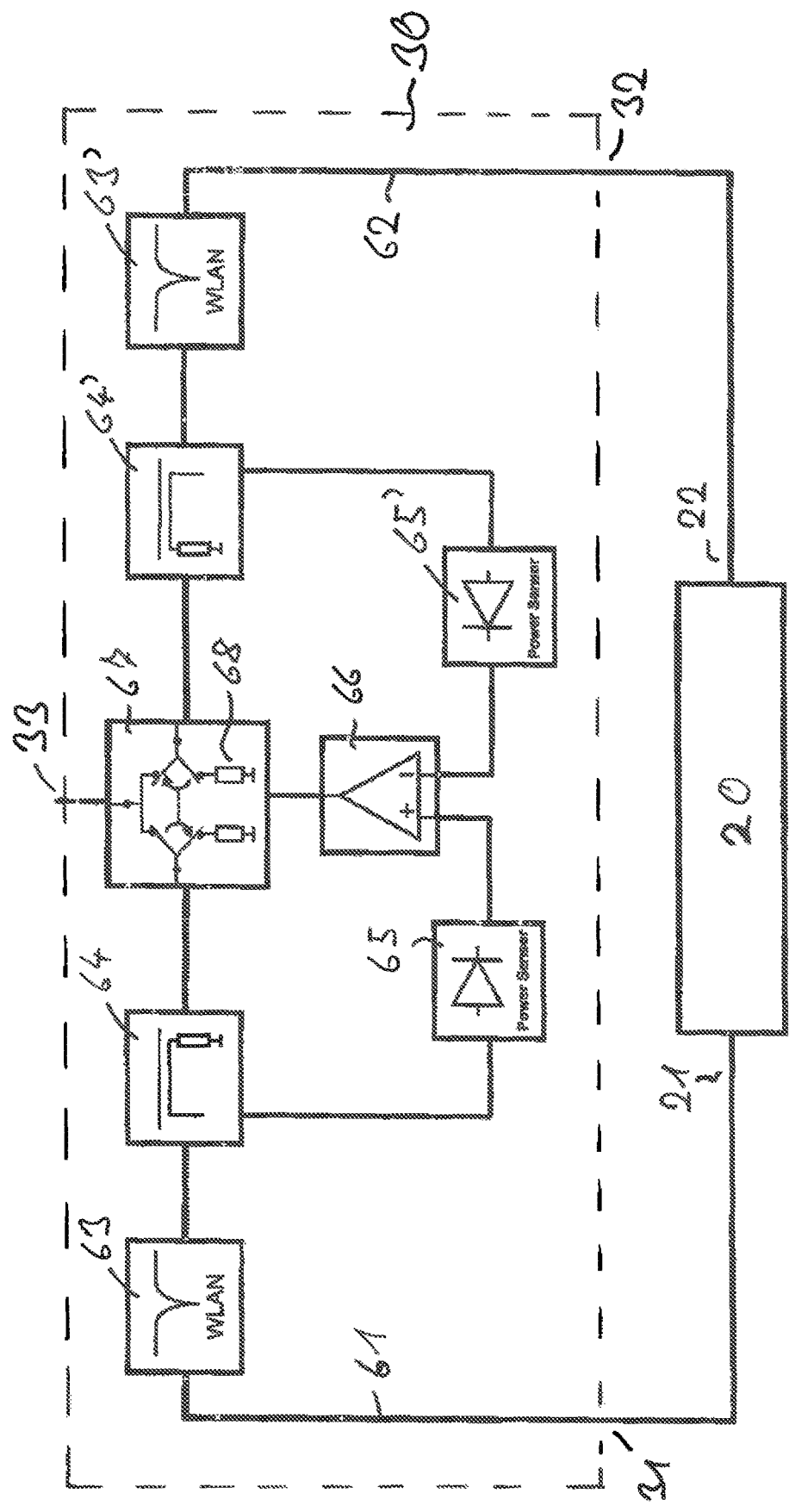
FIG. 4 shows a schematic circuit diagram of a first variant of a connection unit in a system in accordance with the first embodiment of the present invention.

In this respect, a first variant of a possible embodiment for such a connection unit in accordance with the invention having such a functionality is shown in FIG. 4.

A coupling structure 20 having two connections 21 and 22 that are connected to connections 31 and 32 of the connection unit 30 is shown schematically in the lower region of FIG. 4. The external antenna 50 that is not shown can be connected to the third connection 33 of the connection unit 30. The first input 31 and the second input 32 are in this respect connected via a respective signal path 61 and 62 respectively to a switching unit 67 that connects one of these two signal paths and thus one of the two connections 21 or 22 of the coupling structure to the third connection 33 and thus to the external antenna 50 in dependence on the coupling quality. The other signal path that is not connected to the third connection 33 is connected to an impedance 68.

A respective measurement signal is decoupled from the signal paths to evaluate the coupling quality. A respective decoupling element 64 and 64' respectively is provided in the signal paths 61 and 62 respectively for this purpose. In this respect, direction couplers or resistance couplers can be used as decoupling elements 64 and 64', for example. The coupling damping can in this respect be selected in dependence on the application and the configuration, for example at 15 dB.

The measurement signals decoupled via the coupling elements are supplied to level detectors 65 and 65' respectively via which the respective power is evaluated. The outputs of the level detectors 65 and 65' are connected to inputs of a comparator 66 that fixes the signal path having the higher power and thus the higher coupling quality by a comparison of the signal levels and outputs a corresponding switch signal to the switching unit 67. The connection having the better coupling quality is then connected through to the third connection 33 to the external antenna 50; the signal path having the worse coupling quality is connected to an impedance 68.

A coupling structure having exactly two connections is provided in the embodiment. The present invention can, however, also be used with more than two connections of the coupling structure. In this case, the connection unit preferably has one connection and one corresponding signal path for each of the connections of the coupling structure, with the evaluation of the coupling quality taking place in the same manner via the power for each signal path. In this respect, the signal path having the best coupling quality is connected through to the connection 33 and all the other connections are respectively connected to an impedance. The impedance 68 in this respect preferably corresponds to the impedance of the external antenna.

Wireless LAN and/or Bluetooth notch filters 63 and 63' are provided as optional elements in the signal paths 61 and 62 in FIG. 4. They mask the relatively strong wireless LAN signals and/or Bluetooth signals of the cellular radio end device so that the evaluation of the coupling quality only takes place with reference to the cellular radio signals. The wireless LAN and/or Bluetooth notch filters 63 and 63' could also be arranged in the measurement signal paths that branch off from the decoupling elements 64 and 64' instead of in the signal paths 61 and 62.

The connection unit in accordance with the invention is in this respect such that the evaluation of the coupling quality takes place with reference to the transmission signal (uplink) of the cellular radio end device. As already shown above, the primary antenna is currently used both for the downlink and for the uplink for LTE; the secondary antenna in contrast only for the downlink. A low coupling damping or a high coupling quality with respect to the primary antenna of the cellular radio end device is therefore decisive for a stable communication. The coupling to the primary antenna of the cellular radio end device can therefore in this respect be determined via these transmission signals since transmission signals are only transmitted from the cellular radio end device via said primary antenna.

In this respect, the transmission signal of the cellular radio end device is typically anyway stronger than the reception signals so that, with a correspondingly slow time behavior of the connection unit, the switching decision anyway takes place on the basis of the transmission signal. Optionally, however filters for the reception frequency ranges could additionally be used. They are then preferably arranged between the decoupling elements 64 and 64' and the level detectors 65 and 65' in the measurement signal path.

The dynamic behavior of the connection unit can in this respect be set via the speed of the level detectors. The speed is in this respect preferably selected such that changes in the signal level that are only based on the cellular radio protocol used remain out of consideration. Conversely, the speed should be so high that actual changes of the coupling quality quickly result in a switchover to the connection having the better coupling quality.

Figure 5:
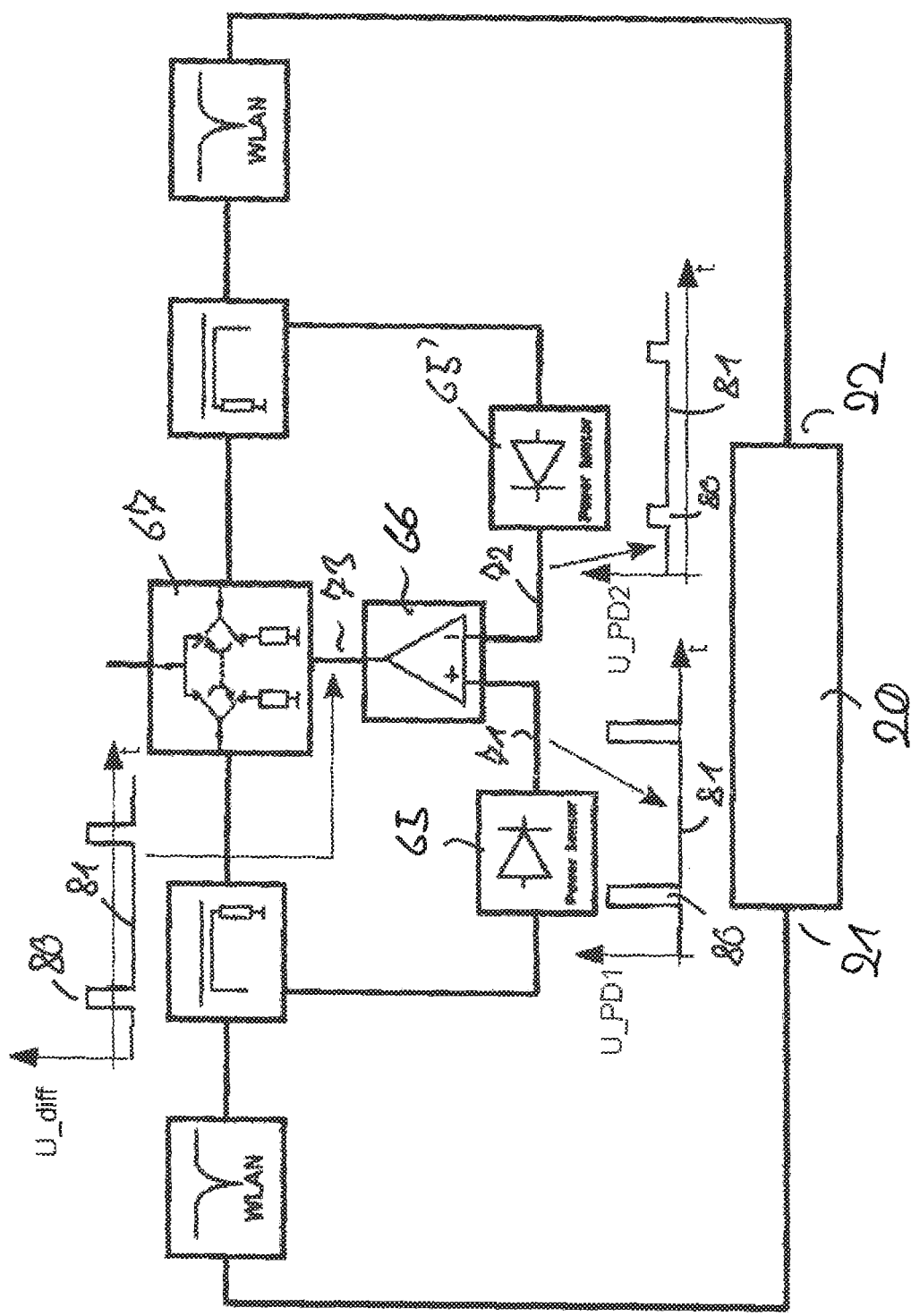
FIG. 5 shows the embodiment shown in FIG. 4 with exemplary signal progressions.

The problem in this respect is presented with reference to FIG. 5 in which the theoretical signal progressions that are shown in more detail without a corresponding time constant of the level detectors being present. The level progression U_PD1 in the region of the connection line 71 between the first level detector 65 and the comparator 66 and the level progression U_PD2 in the region of the connection line 72 between the second level detector 65' and the comparator 66 in this respect represent a possible level progression when the cellular radio end device works in a service having a time multiplex division such as GSM or TD-LTE. It is assumed in this respect that the coupling of the first connection 21 of the coupling structure 20 to the primary antenna of the cellular radio end device that is used for the transmission is better than the coupling quality of the second connection 22.

In this respect, the uplink phase of the signal is respectively marked by 80; the downlink phase by 81. The signal U_PD1 associated with the first connection 21 is in this respect considerably stronger in the region of the uplink phase than the corresponding signal U_PD2 of the second connection 22. Inverted conditions are in contrast present during the downlink phase 81 due to noise, external cellular radio signals and/or interference influences so that the signal U-PD2 is stronger in the region 81 than the signal U-PD1. If now as only shown for purposes of illustration in FIG. 5, the signal without an evaluation of the signal over a certain time window is used for the switchover decision, a switchover is carried out in the case shown in FIG. 5 between the uplink phase 80 and the downlink phase 81 between the first connection 21 and the second connection 22, as can be recognized from the corresponding switch signal U_diff in the region of the control line 73 between the comparator 66 and the switching unit 67.

Such a switchover between the uplink phase and the downlink phase should, however, be avoided. This is achieved by a correspondingly slow time behavior of the connection unit that therefore does not react to the fast level change within the time multiplex division. The connection unit can in particular integrate over a plurality of bursts and/or subframes and/or frames of the communication protocol and can thus work independently of the bursts/subframes. In the current time multiplex division (burst 0.6 ms to 1 ms, frame 4.7 ms to 10 ms), the time constant can in this respect be selected in a range between 1 ms and 500 ms, preferably in a range between 15 ms and 100 ms. The time behavior of the level detectors can be selected accordingly for this purpose.

The comparator can furthermore have a certain hysteresis to avoid too frequent a switching over. Alternatively or additionally, a 2-point switchover is also conceivable.

Figure 6:
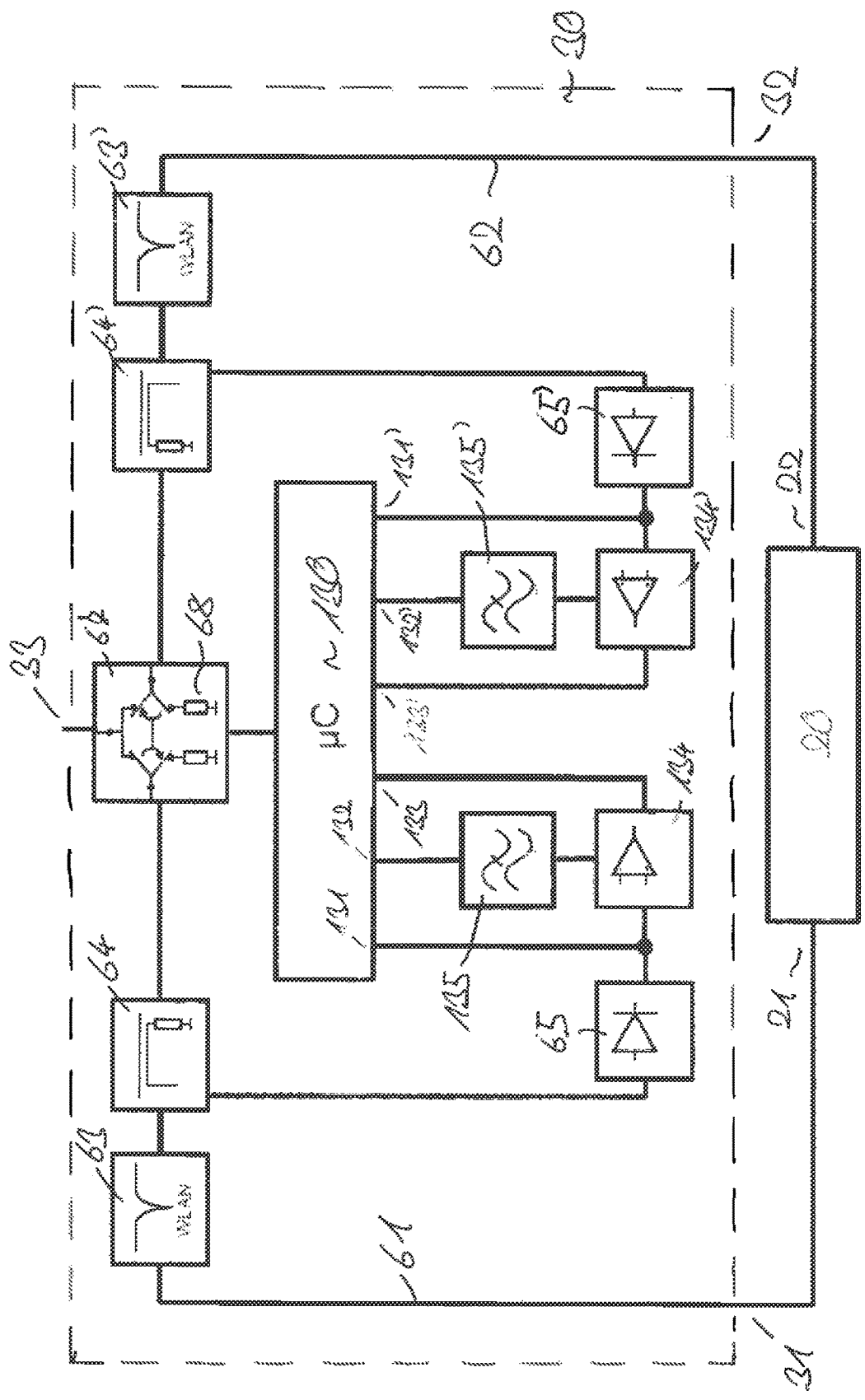
FIG. 6 shows a schematic circuit diagram of a second variant of a connection unit in a system in accordance with the first embodiment of the present invention.

FIG. 6 shows a second variant of a connection unit 30 such as can be used in cases of the embodiment shown in FIG. 1. The embodiment shown in FIG. 6 corresponds with respect to the connections 31-33, the signal paths 61 and 62, the filters 63 and 63', the decoupling elements 64 and 64', the level detectors 65 and 65', the switching unit 67, and the impedance 68 to the first variant shown in FIGS. 4 and 5. Reference is therefore made to the above description with respect to the design of these components.

The evaluation of the coupling quality in the variant shown in FIG. 6, however, no longer takes place by a comparator, but rather by a microcontroller 130. The use of such a microcontroller allows more degrees of freedom with respect to the evaluation criteria.

The microcontroller 130 has respective inputs 131 and 131' for the signals decoupled from the signal paths 61 and 62. Level detectors 65 and 65' are provided for this purpose whose outputs are respectively connected to an input 131 and 131' respectively of the microcontroller 130.

The microcontroller 130 has at least one analog-to-digital converter that senses the signals applied at the inputs 131 and 131'. A mean value formation is preferably carried out over a plurality of samples, preferably a mean value formation over 2 to 20 samples, further preferably over 2 to 8 samples. The mean value is then used for a comparison of the coupling quality of the respective signal paths and for a corresponding control of the switching unit 67.

In a first embodiment variant, the microcontroller 130 has a separate analog-to-digital converter for each signal input, i.e. for each signal path. In a second embodiment variant, the microcontroller can, however, also work only with an analog-to-digital converter that alternately generates samples of the signals applied at a plurality of inputs. The technical switching effort can hereby be reduced. The samples at the respective connections are preferably generated in such a narrow time interval that they can be considered as simultaneous in comparison with external interference. At least two samples preferably enter into the mean value formation for the individual connections and a sample was taken at a different connection between their recording. The simultaneity is also hereby ensured.

The microcontroller 130 additionally has interrupt inputs 133 and 133' which are controlled by a comparator circuit 134 and 134' respectively in the embodiments shown. A permanent sensing of the level values can be dispensed with by the use of interrupts in order thus to reduce the computation load of the microcontroller. A minimum level threshold is defined for this purpose from which onward a level evaluation of the connections of the coupling structure is carried out. If the cellular radio end device receives data in the downlink, for example, but there is no traffic in the uplink, interference signals received from the outside have no effect on the system behavior since they are below the comparator threshold.

The comparators 134 and 134' compare the signal levels received from the level detectors 65 and 65' with the minimum level threshold and trigger an interrupt at the interrupt inputs 133 and 133' on an exceeding of the minimum level threshold. A sensing of the level values in this respect already takes place in the embodiment even if only one of the interrupts was triggered.

In the embodiment, the minimum level threshold that is present as a comparison value at the comparator 134 and 134' is predefined by the microcontroller. Since the minimum level threshold is generated by the microcontroller, it can be set in a flexible manner. In the embodiment, this takes place via PWM outputs 132 and 132' that deliver the comparison values to the comparators 134 and 134'. Low pass filters 135 and 135' are arranged between the PWM outputs 132 and 132' and the comparison inputs of the comparators 134 and 134' in the embodiment.

The use of a microcontroller offers the possibility of a flexible programming of the criteria for the selection of the best connection to the coupling structure.

A hysteresis can be implemented in a possible embodiment. To avoid permanent switching processes in the case of similar coupling qualities of the at least two connections of the coupling structure, a required level difference can be predefined only from which onward a switch is made to the respective better connection.

Furthermore, as described above, in the case of the interrupt triggering, the values determined by the analog-to-digital converter(s) can be averaged over a plurality of samples to reduce interference influences. The evaluation of the coupling connections only then takes place on the basis of the mean value.

In the second variant shown in FIG. 6, the comparators 134 and 134' were designed as separate components. In the third variant shown in FIG. 7, the functionality of the comparators is in contrast directly implemented in the microcontroller 140. The third variant shown in FIG. 7 therefore works in exactly the same manner as has already been described in more detail above with respect to the second variant shown in FIG. 6.

An exemplary system behavior of the variants of a connection unit 30 and an embodiment of the method in accordance with the invention shown in FIG. 6 or 7 will be shown in the following:

The cellular radio end device transmits in the uplink, with the first coupling connection 21 being e.g. 4 dB better than the second coupling connection 22.

The values of (at least one) level detector 65, 65' exceed the minimum level threshold for the triggering of the interrupt by the comparator circuit 134, 134'.

A sensing of the level values of the level detectors 65, 65' present at the inputs 131, 131' of the microcontroller takes place by one or more analog-to-digital converters of the microcontroller 130 and 140 respectively. In this respect, a mean value formation is carried out per analog-to-digital converter or for the samples associated with the respective connection. The mean value formation can in this respect comprise between 1 and 20 samples, typically approximately 4 samples. The two mean values are now compared with one another to determine the connection having the best coupling quality. The microcontroller in this respect determines that the level at the first connection 21 is e.g. 4 dB higher than at the second connection 22. This level difference is now compared with the predefined hysteresis, i.e. with the minimally required level difference.

If the level difference is larger than the predefined hysteresis, the coupling connection 21 is connected through to the output 33 if the connection 21 is not anyway already active. If the connection 21 having the better coupling quality is anyway already active, no switching procedure naturally takes place.

The interrupt inputs 133 and 133' are now again switched to active.

In the embodiment shown in FIG. 1 that implements the first aspect of the present invention, only one single external antenna 50 is provided that is connected to one of the at least two connections of the coupling structure via the connection unit in dependence on the coupling quality.

Figure 8:
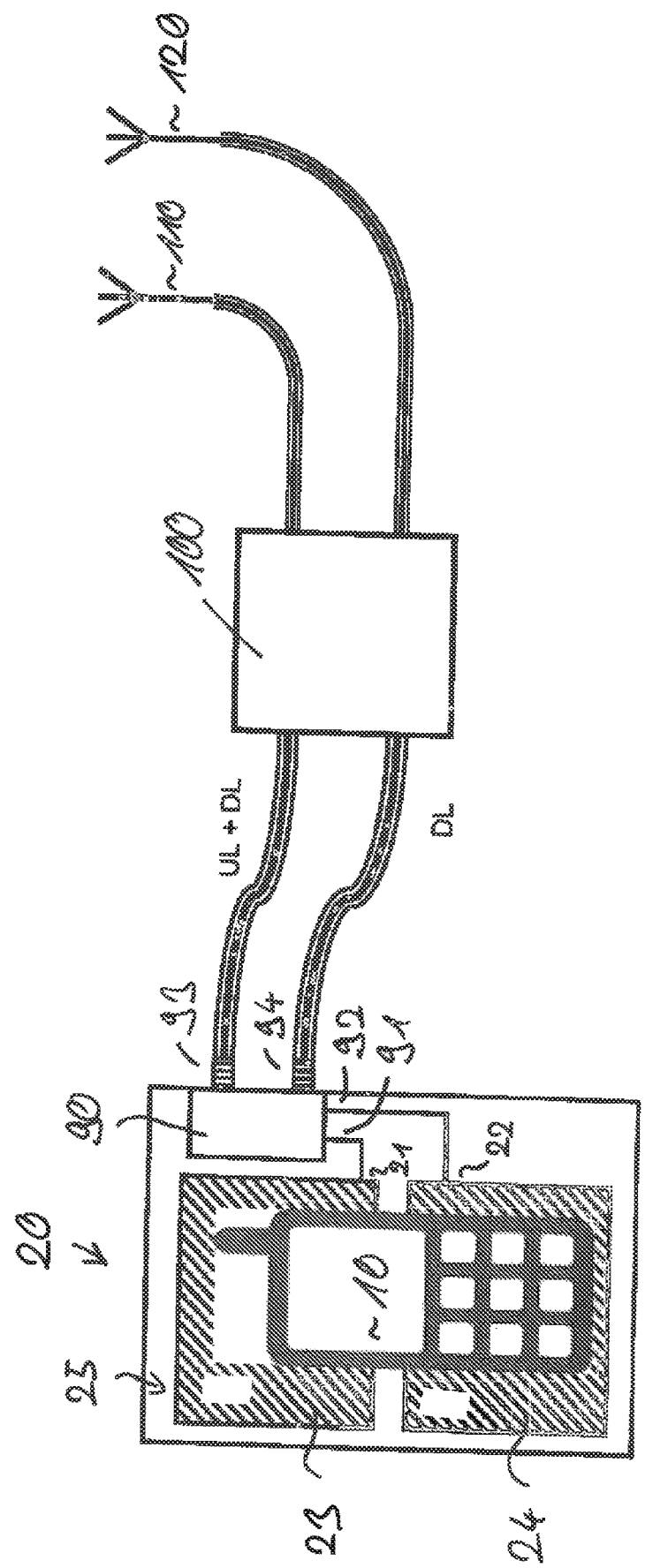
FIG. 8 shows a schematic diagram of a second embodiment of a system in accordance with the invention.

A second embodiment is in contrast shown in FIG. 8 that implements the second aspect of the present invention and in which the connection unit 90 establishes a connection between the first and second connections 21 and 22 of the coupling structure 25 and a first and second cellular radio antenna 110 and 120.

With regard to the design of the coupling structure and/or of the receiver and/or support, the same applies to the second embodiment in this respect as has already been shown in more detail above with regard to the first embodiment. The connection unit 90 of the second embodiment in this respects like the connection unit 30 of the first embodiment has a first connection 91 that is connected to the first connection 21 of the coupling structure 25 and has a second connection 92 that is connected to the second connection 22 of the coupling structure. The second embodiment thus also corresponds to the first embodiment to this extent.

The connection unit 90 of the second embodiment, however, has a third connection 93 for connection to a first external antenna 110 and a fourth connection 94 for connection to a second external antenna 120. The second embodiment in this respect takes into account that external antenna structures such as automotive antennas can likewise have a primary antenna and a secondary antenna to support the MIMO functionality of cellular radio services such as LTE. The first external antenna 110 can therefore in particular be the primary external antenna; the second external antenna can be the secondary external antenna.

The connection unit 90 is set up such that the two external antennas 110 and 120 are each separately connected to one of the two connections 21 and 22 of the coupling structure 25. An evaluation of the respective coupling quality of the two connections takes place for this purpose, with the connection having the better coupling quality in the uplink being connected to the first external antenna and the connection of the coupling structure having the worse coupling quality in the uplink being connected to the secondary antenna 120. It is hereby ensured that a stable communication is ensured both in the downlink and in the uplink since the respective connection having the smallest coupling damping with respect to the primary antenna of the cellular radio end device is connected to the primary external antenna. A good MIMO functionality with a high power results by the connection of the other connection, that at least also couples to the secondary antenna of the cellular radio end device, to the secondary external antenna. A MIMO functionality with high power can in particular result due to the different coupling (amount and phase) between the two connections of the coupling structure and the two MIMO antennas in the smartphone.

The second embodiment can also implement the first aspect of the present invention. The evaluation of the coupling quality and the switchover can in this respect in particular take place in the same manner as in the second embodiment as in the first embodiment described in more detail above so that reference is made to the above presentation in this respect.

Figure 9:
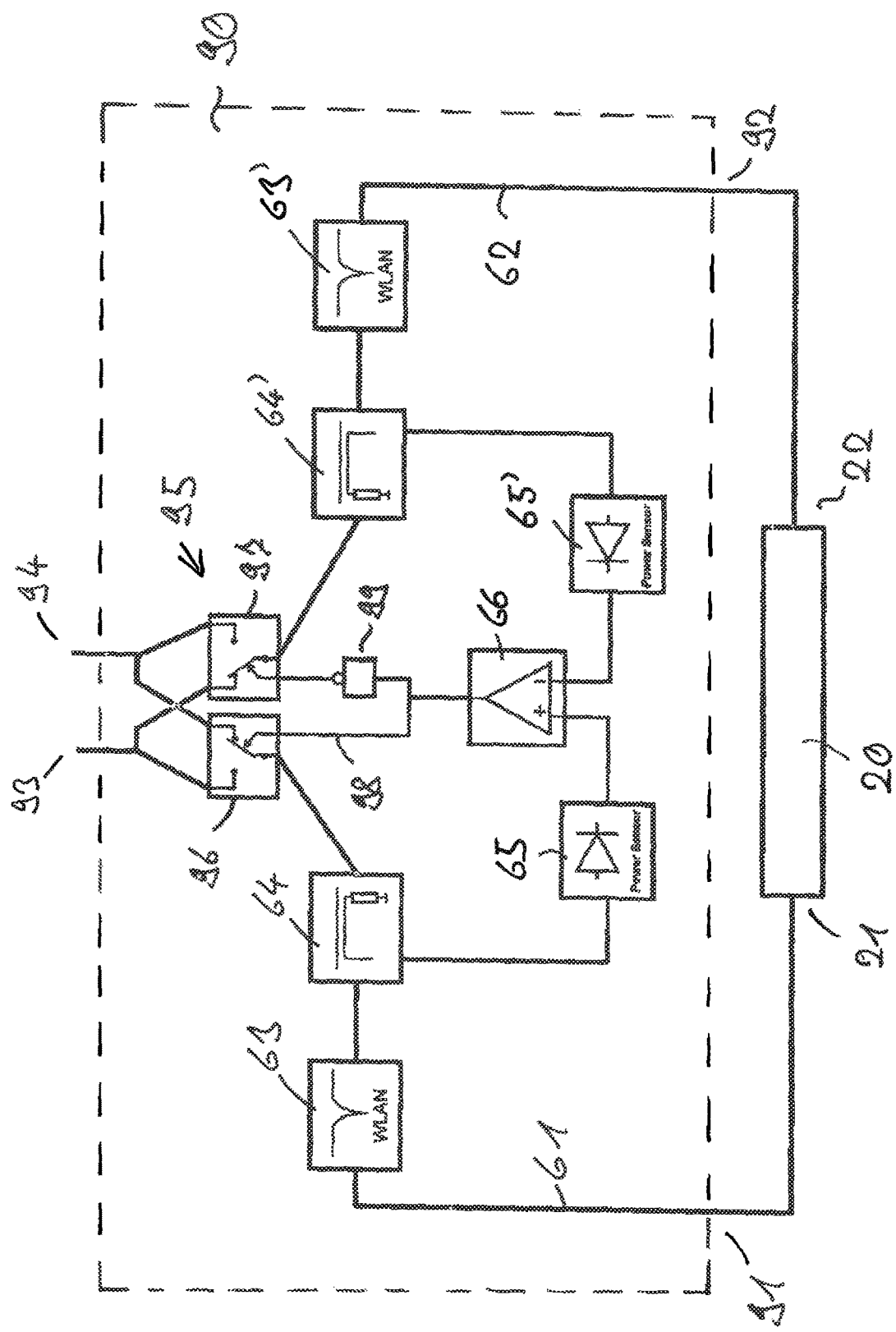
FIG. 9 shows a schematic circuit diagram of a first variant of a connection unit in a system in accordance with the second embodiment of the present invention.

A circuit diagram for a first variant of such a connection unit 90 of the second embodiment is shown in FIG. 9. Elements that are provided in the same manner as in the first embodiment have therefore been provided with the same reference numerals in this respect. Reference is made to the above presentation with regard to these elements.

In this respect two signal paths 61 and 62 are in particular again provided that are associated with the connections 21 and 22 of the coupling structure 20 and that lead to the switching unit 95. Measurement signals that are supplied to level detectors 65 and 65' are in turn decoupled from these signal paths via decoupling elements 64 and 64'. The signals of the level detectors are supplied to a comparator 66 that outputs a switching signal to the switching unit 95. The operation of the second embodiment is identical to the first embodiment with respect to these components.

The switching unit 95 in contrast has two switching elements 96 and 97 that are associated with the respective signal paths 61 and 62 and each establish either a connection to the third connection 93 or to the fourth connection 94 to the first or second external antenna 110 and 120. The switching elements 96 and 97 are in this respect interconnected to the output of the comparator 66 such that the second switching element 96 establishes a connection of the second signal path 62 to the third connection 93 when the first switching element 96 establishes a connection of the first signal path 61 to the fourth connection 94 and vice versa. This is solved in the embodiment in that the output of the comparator 66 is directly connected to the first switching element 96 via a switch line 98 while a logical inverter is provided in the connection to the second switching element 97.

A continuous evaluation of the coupling damping on both connections of the coupling structure also takes place here by a comparison of the respective powers in the signal paths and thus a dynamic selection of the connections with reference to the coupling quality. The uplink signal is also in turn used here for evaluating, which takes place in the same manner as in the first embodiment. Optionally, wireless LAN and/or Bluetooth notch filters 63 can also be provided in the signal paths here, and optionally filters for the reception signals in the measurement signal lines.

Figure 10:
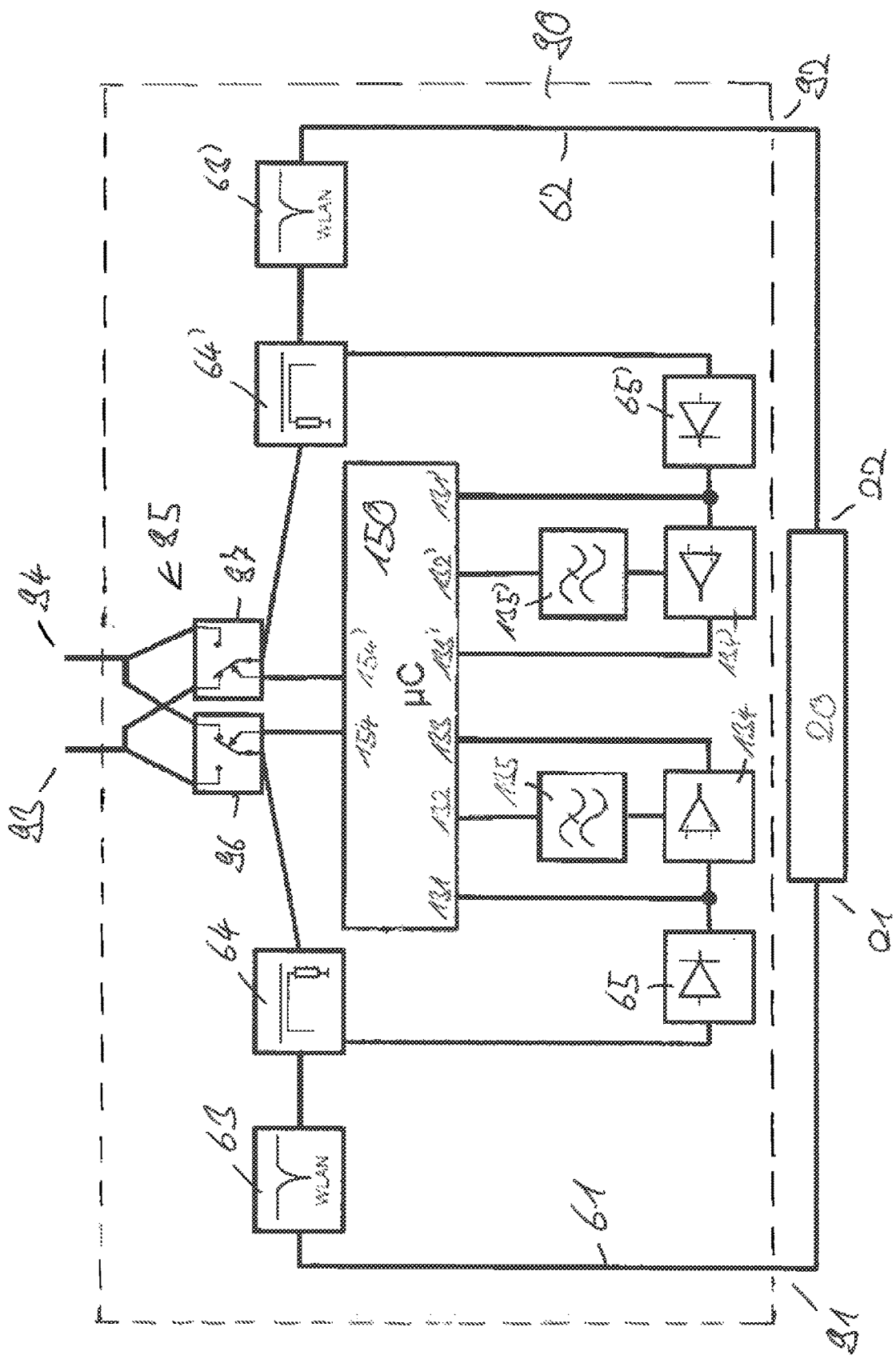
FIG. 10 shows a schematic circuit diagram of a second variant of a connection unit in a system in accordance with the second embodiment of the present invention.
Figure 11:
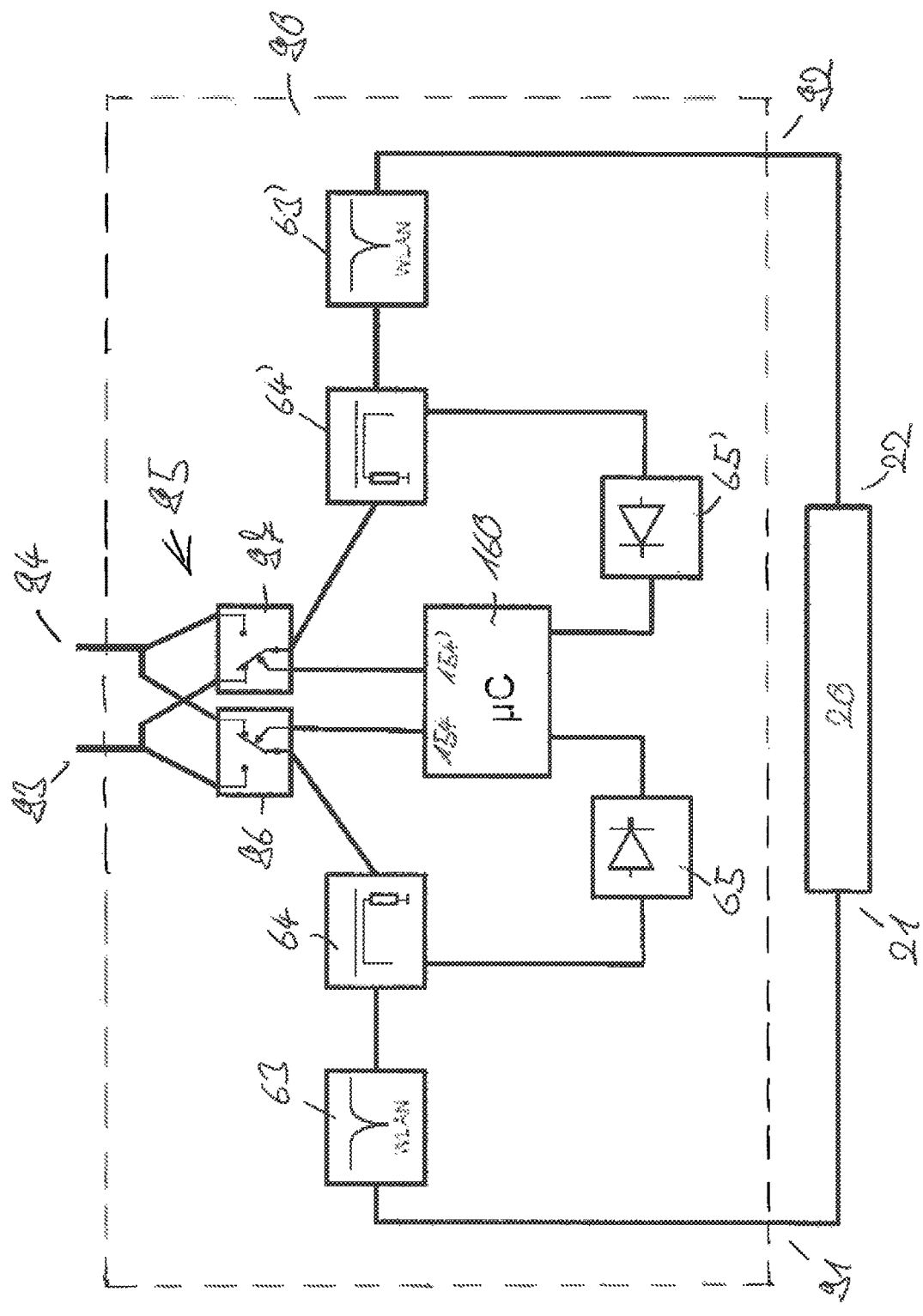
FIG. 11 shows a schematic circuit diagram of a third variant of a connection unit in a system in accordance with the second embodiment of the present invention.

A second and third variant of the embodiment of a connection unit 90 shown in FIG. 9 are shown in FIGS. 10 and 11, said connection unit being able to be used in the second embodiment of the present invention. The connection unit 90 in accordance with the second and third variants corresponds to the variant shown in FIG. 9 with respect to the connections 91 to 94, to the signal paths 61 and 62, to the filters 63 and 63', to the decoupling elements 64 and 64', to the switching unit 95 having the switching elements 96 and 97, and to the level detectors 65 and 65'. Reference is therefore made to the above presentation with respect to the corresponding components.

Figure 7:
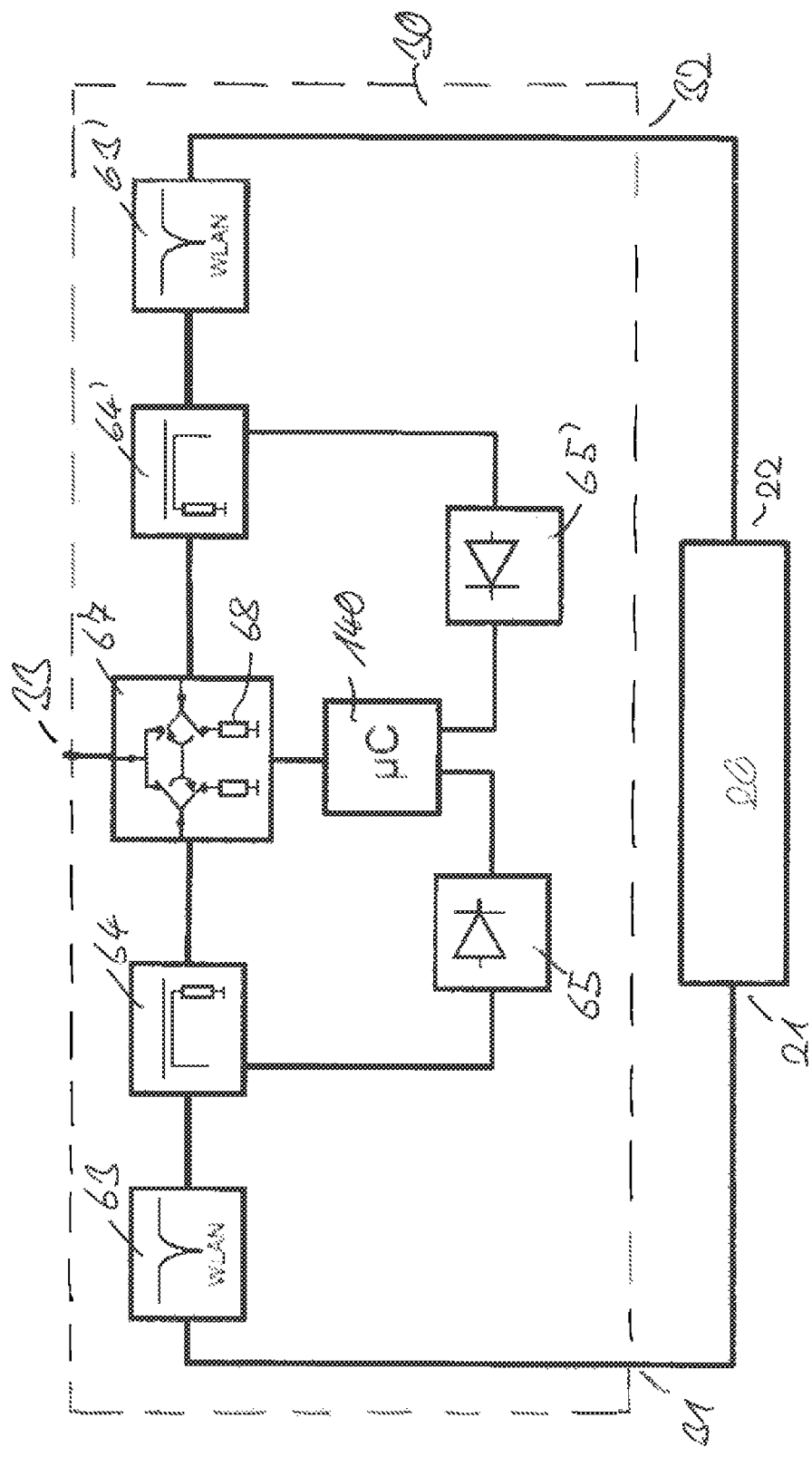
FIG. 7 shows a schematic circuit diagram of a third variant of a connection unit in a system in accordance with the first embodiment of the present invention.

Unlike in the first variant shown in FIG. 9, however, use is not made of a comparator 66 for the evaluation of the coupling quality and for the control of the switching unit 95, but use is rather in turn made of a microcontroller 150 and 160 as in the variants shown in FIGS. 6 and 7 of the first embodiment.

The microcontroller 150 of the second variant of the second embodiment shown in FIG. 10 corresponds to the microcontroller 130 of the second variant of the first embodiment shown in FIG. 6 with respect to its inputs 131 to 133 and 131' to 133', to the connection to the level detectors 65, 65' and to the comparators 134, 134'. Reference is therefore made in full to the above representation in this respect.

The only difference between the microcontrollers 130 and 150 is that the microcontroller 150 has two outputs 145 and 145' for controlling the two switching elements 96 and 97 of the switching unit 95. The two switching elements 96 and 97 are controlled in this respect in the second variant in FIG. 10 in the same way as in the first variant in FIG. 9. The signal path having the better coupling quality is in particular connected to the connection 93 for the primary antenna and the signal path having the poor coupling quality is connected to the connection 94 for the secondary antenna on the basis of the evaluation of the coupling quality.

The switchover decision can here also take place while using a mean value formation and/or a hysteresis such as has been shown in more detail with regard to the second variant of the first embodiment in FIG. 6.

FIG. 11 in turn shows a third variant functionally equivalent to the second variant shown in FIG. 10 in which the functionality of the comparators 134 and 134' has been integrated in the microcontroller 160.

As shown in more detail in FIG. 8, a MIMO compensator 100 can optionally be provided. It can have a particularly simple structure in accordance with the invention since the power compensation in the uplink only has to take place in one path. This is ensured in accordance with the invention in that the uplink signal of the cellular radio end device is always connected onward over the third connection 93 to the primary external antenna 110.

The first aspect of the present invention in this respect has the advantage that a simply designed circuit can be used having a small technical construction effort and a small power consumption. In this respect, a permanent simultaneous evaluation of all the connections of the coupling structure and thus a dynamic selection of the best connection take place. The best connection can hereby be selected in dependence on the respective used service and frequency range. The evaluation of the coupling quality in this respect takes place as part of the communication in the real cellular radio network so that an upstream test mode and a communication between the connection unit and the cellular radio end device are not required. The positional and orientation independence with regard to the positioning of the cellular radio end device relative to the coupling structure is furthermore improved.

If, in accordance with the second aspect of the present invention, a primary external antenna and a secondary external antenna are provided, the different coupling (amount and phase) between the two connections of the coupling structure and the two MIMO antennas in the cellular radio end device and by their separate connection to the primary and secondary external antennas produce a MIMO functionality of high power.

If the first aspect is also used here, it is likewise ensured by the dynamic selection that the connection having the best coupling to the primary antenna of the cellular radio end device that has an uplink functionality and a downlink functionality is selected dynamically and is connected to the external antenna of the vehicle.

An optionally provided MIMO compensator can furthermore have a particularly simple structure.

The invention claimed is:

1. A system for wireless coupling of a cellular radio end device to an external antenna structure having at least one first external antenna,
   having a coupling structure for wireless coupling to an antenna structure of the cellular radio end device, with the coupling structure having at least two connections; and
   having a connection unit that connects the first external antenna to one of the at least two connections of the coupling structure in dependence on a coupling quality; wherein
   the connection unit evaluates the coupling quality between the antenna structure of the cellular radio end device and the at least two connections of the coupling structure,
   the connection unit has an evaluation unit that evaluates the coupling quality of a first and second connections of the coupling structure to the antenna structure of the cellular radio end device and controls a switching unit that connects the first external antenna to one of the at least two connections of the coupling structure in dependence on the coupling quality, and
   the connection unit comprises a decoupling element for each signal path of the at least two connections of the coupling structure, with a signal being decoupled from the respective signal path and being supplied to the evaluation unit by the decoupling element; and wherein the evaluation unit has at least two inputs that are connected to the signal paths via the decoupling elements.

2. The system in accordance with claim 1
   wherein the at least two connections of the coupling structure are connectable by the connection unit to the first external antenna and to at least one second external antenna of the external antenna structure.

3. The system in accordance with claim 2, wherein the at least two connections of the coupling structure are connectable to the first external antenna and to the second external antenna of the external antenna structure separately from one another via the connection unit; and/or wherein the connection unit evaluates a coupling quality of the connections and connects the first and second external antennas to first and second connections of the coupling structure in dependence on the coupling quality; and wherein the external antenna structure is an external vehicle antenna structure.

4. A system for wireless coupling of a cellular radio end device to an external antenna structure having at least one first external antenna,
   having a coupling structure for wireless coupling to an antenna structure of the cellular radio end device, with the coupling structure having at least two connections; and
   having a connection unit that connects the first external antenna to one of the at least two connections of the coupling structure in dependence on a coupling quality; wherein
   the connection unit evaluates the coupling quality between the antenna structure of the cellular radio end device and the at least two connections of the coupling structure, wherein the connection unit connects the connection of the coupling structure having a better coupling quality to the first external antenna, and wherein the connection unit connects at least one connection having a worse coupling quality to an impedance and/or to a second external antenna.

5. The system in accordance with claim 4, wherein the connection unit has an evaluation unit that evaluates the coupling quality of a first and second connections of the coupling structure to the antenna structure of the cellular radio end device and controls a switching unit that connects the first external antenna to one of the at least two connections of the coupling structure in dependence on the coupling quality.

6. The system in accordance with claim 5, wherein the connection unit comprises a decoupling element for each signal path of the at least two connections of the coupling structure, with a signal being decoupled from the respective signal path and being supplied to the evaluation unit by the decoupling element; and wherein the evaluation unit has at least two inputs that are connected to the signal paths via the decoupling elements.

7. The system in accordance with claim 5, wherein the evaluation unit comprises a comparator and/or a comparison logic; and/or wherein the evaluation of the coupling quality takes place with reference to signal levels of the signals; wherein the evaluation unit comprises a level detector for each signal path; and/or wherein the evaluation unit has an interrupt control by which the evaluation of the coupling quality only takes place on an exceeding of a minimum level threshold, with the minimum level threshold being settable.

8. The system in accordance with claim 1, wherein the connection unit is configured such that an evaluation of the coupling quality takes place with reference to a cellular radio transmission signal of the cellular radio end device.

9. The system in accordance with claim 1, wherein specific frequency ranges remain out of consideration for the evaluation of the coupling quality with at least one corresponding filter being provided.

10. The system in accordance with claim 1, wherein a switchover decision takes place with reference to a coupling quality determined over a time interval;
wherein a mean value formation and/or a maximum value formation takes place via the time interval;
and/or wherein the switchover decision takes place with reference to a coupling quality evaluated over a time interval of 1 ms to 500 ms;
and/or wherein the time interval comprises both transmission signals and reception signals in the event of a time multiplex division, with the connection unit evaluating the coupling quality over a plurality of bursts and/or subframes and/or frames of a signal and with the connection unit integrating the signal for this over a plurality of bursts and/or subframes and/or frames.

11. The system in accordance with claim 1, having a compensator that is arranged in a signal path between the connection unit and the first external antenna and/or a second external antenna, with the compensator having a first and second signal path in a case of a first and second external antenna, with a transmission amplification only taking place in one signal path.

12. The system in accordance with claim 1, wherein the coupling structure is arranged in a region of a support and/or of a receiver for the cellular radio end device, with further coupling structures and/or functional elements being provided in the region of the support and/or receiver, and/or with the cellular radio end device being able to be freely positioned at least within a specific region.

13. A system for wireless coupling of a cellular radio end device to an external antenna structure having at least one first external antenna,
having a coupling structure for wireless coupling to an antenna structure of the cellular radio end device, with the coupling structure having at least two connections; and
having a connection unit that connects the first external antenna to one of the at least two connections of the coupling structure in dependence on a coupling quality;
wherein
the connection unit evaluates the coupling quality between the antenna structure of the cellular radio end device and the at least two connections of the coupling structure, wherein the connection unit has at least one first and one second connection for connection to the at least two connections of the coupling structure and at least one third connection for connection to the first external antenna and at least one fourth connection for connection to a second external antenna, with the connection unit forming a separate assembly or forming an assembly with the coupling structure.

14. A method of coupling an antenna structure of a cellular radio end device to at least one first external antenna,
wherein the coupling of the antenna structure of the cellular radio end device takes place wirelessly by means of a coupling structure that has at least two connections;
wherein the first external antenna is connected to one of the at least two connections of the coupling structure in dependence on a coupling quality,
wherein
the coupling quality between the antenna structure of the cellular radio end device and the at least two connections of the coupling structure is evaluated during a normal communication operation of the cellular radio end device and/or continuously and/or for both connections simultaneously;
and/or in that the at least two connections of the coupling structure are connected to at least one first external antenna and to a second external antenna of the external antenna structure,
the method using a system for the wireless coupling of the cellular radio end device to the external antenna structure, wherein a connection unit connects the first external antenna to one of the at least two connections of the coupling structure, and wherein the connection unit evaluates the coupling quality.

15. The system in accordance with claim 1, wherein the external antenna structure is an external vehicle antenna structure.

16. A system for wireless coupling of a cellular radio end device to an external antenna structure having at least one first external antenna,
having a coupling structure for wireless coupling to an antenna structure of the cellular radio end device, with the coupling structure having at least two connections; and
having a connection unit that connects the first external antenna to one of the at least two connections of the coupling structure in dependence on a coupling quality;
wherein
the connection unit evaluates the coupling quality between the antenna structure of the cellular radio end device and the at least two connections of the coupling structure during a normal communication operation of the cellular radio end device and/or continuously and/or for both connections simultaneously, wherein the connection unit is configured such that an evaluation of the coupling quality takes place with reference to a cellular radio transmission signal of the cellular radio end device.

17. The system in accordance with claim 9, wherein the specific frequency range is a wireless LAN frequency range and/or a reception frequency range, and wherein a filter is associated with each input of an evaluation unit.

18. The method in accordance with claim 14, wherein the at least one first external antenna is an external vehicle antenna.

* * * * *